United States Patent
Lim et al.

(10) Patent No.: US 9,313,765 B2
(45) Date of Patent: Apr. 12, 2016

(54) METHOD FOR MEASURING POSITION IN WIRELESS COMMUNICATION SYSTEM

(71) Applicant: LG ELECTRONICS INC., Seoul (KR)

(72) Inventors: Suhwan Lim, Anyang-si (KR); Manyoung Jung, Anyang-si (KR); Yoonoh Yang, Anyang-si (KR); Sangwook Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/394,443

(22) PCT Filed: May 8, 2013

(86) PCT No.: PCT/KR2013/004038
§ 371 (c)(1),
(2) Date: Oct. 14, 2014

(87) PCT Pub. No.: WO2013/172588
PCT Pub. Date: Nov. 21, 2013

(65) Prior Publication Data
US 2015/0072708 A1      Mar. 12, 2015

Related U.S. Application Data

(60) Provisional application No. 61/646,846, filed on May 14, 2012.

(51) Int. Cl.
| H04W 24/00 | (2009.01) |
| H04W 64/00 | (2009.01) |
| G01S 5/10 | (2006.01) |
| G01S 5/02 | (2010.01) |
| H04W 4/02 | (2009.01) |

(52) U.S. Cl.
CPC .............. *H04W 64/00* (2013.01); *G01S 5/0236* (2013.01); *G01S 5/10* (2013.01); *H04W 4/02* (2013.01)

(58) Field of Classification Search
CPC ...... H04W 64/00; H04W 4/02; G01S 5/0236; G01S 5/10
USPC ......... 455/456.1, 450, 404.2, 456.6; 370/252, 370/328, 342
See application file for complete search history.

(56) References Cited

U.S. PATENT DOCUMENTS

| 2011/0064162 A1* | 3/2011 | McCallister et al. ......... 375/296 |
| 2011/0205914 A1* | 8/2011 | Krishnamurthy et al. .... 370/252 |

(Continued)

FOREIGN PATENT DOCUMENTS

| KR | 10-2003-0003382 | 1/2003 |
| KR | 10-2010-0113036 | 10/2010 |
| KR | 10-2010-0117634 | 11/2010 |

OTHER PUBLICATIONS

PCT International Application No. PCT/KR2013/004038, Written Opinion of the International Searching Authority dated Aug. 21, 2013, 1 page.

*Primary Examiner* — Dhaval Patel
(74) *Attorney, Agent, or Firm* — Lee, Hong, Degerman, Kang & Waimey

(57) ABSTRACT

According to one embodiment of the present specification, provided is a method for measuring a position in a wireless communication system. The method for measuring a position comprises the steps of: receiving observed time difference of arrival (OTDOA) assistance data from a positioning server; increasing an FFT sampling size when the value of a bandwidth of a positioning reference signal (PRS) included in the OTDOA assistance data is less than a first value; processing a plurality of received PRSs through the increased FFT sampling size; and calculating a reference signal time difference (RSTD) between the plurality of received PRSs.

9 Claims, 19 Drawing Sheets

(56) References Cited

U.S. PATENT DOCUMENTS

| | | |
|---|---|---|
| 2011/0275385 A1 | 11/2011 | Escolar-Piedras et al. |
| 2012/0015667 A1 | 1/2012 | Woo et al. |
| 2012/0281859 A1* | 11/2012 | Villemoes et al. ............. 381/98 |
| 2013/0051317 A1* | 2/2013 | Ji et al. ......................... 370/328 |

* cited by examiner

METHOD FOR MEASURING POSITION IN
WIRELESS COMMUNICATION SYSTEM

CROSS-REFERENCE TO RELATED APPLICATIONS

This application is the National Stage filing under 35 U.S.C. 371 of International Application No. PCT/KR2013/004038, filed on May 8, 2013, which claims the benefit of U.S. Provisional Application Ser. No. 61/646,846, filed on May 14, 2012, the contents of which are all hereby incorporated by reference herein in their entirety.

BACKGROUND OF THE INVENTION

1. Field of the Invention

The present invention relates to wireless communications, and more particularly, to a method and apparatus for measuring a position in a wireless communication system.

2. Related Art

User Equipment (UE) positioning for estimating a location of a UE has recently been used for various usages in real life, and thus a more accurate UE positioning method is required. The UE positioning method can be roughly classified into four methods.

1) Global positioning system (GPS)-based method: In this method, a satellite is used to estimate the location of the UE. Information must be received from at least four satellites. Disadvantageously, this method cannot be used in an indoor environment.

2) Terrestrial positioning-based method: In this method, the location of the UE is estimated by using a timing difference of signals transmitted from base stations (BSs). Signals must be received from at least three BSs. Although this method has a lower location estimation performance in comparison with the GPS-based method, it can be used in most of environments. A signal received from the BS may be a synchronization signal or a reference signal (RS), and according to a wireless communication system in use, can be defined in various terms, such as observed time difference of arrival (OTDOA) in UMTS terrestrial radio access network (UTRAN), enhanced observed time difference (E-OTD) in GSM/EDGE radio access network (GERAN), advanced forward link trilateration (AFLT) in CDMA2000, etc.

The RS can be used to estimate the location of the UE. The RS may include a synchronization signal. The UE can receive RSs transmitted from multiple cells, and can use a difference in a time delay of each signal. The UE may report the difference in the time delay to the BS so that the BS can calculate the location of the UE, or may autonomously calculate the location of the UE. Referring to the section 4.1.1 of $3^{rd}$ generation partnership project (3GPP) long term evolution (LTE) TS36.355 V9.0.0(2009-12), an enhanced serving mobile location center (E-SMLC) can use a LTE positioning protocol (LPP) to control measurement values such as a reference signal time difference (RSTD) measured by the UE. The LPP can be defined as a point-to-point between a location server (e.g., E-SMLC, etc.) and a target device (i.e., UE, etc.) so that a location of the target device can be estimated using a location relation measurement value obtained from one or more RSs.

SUMMARY OF THE INVENTION

The present invention aims at further improvement in an accuracy of a reference signal time difference (RSTD).

According to an aspect of the present invention, the present invention provides a method of measuring a position in a wireless communication system. The method may comprise: receiving observed time difference of arrival (OTDOA) assistance data from a location server; increasing a fast Fourier transform (FFT) sampling size if a value of a bandwidth of a positioning reference signal (PRS) included in the OTDOA assistance data is less than a first value; processing a plurality of received PRSs by using the increased FFT sampling size; and calculating a reference signal time difference (RSTD) between the plurality of received PRSs.

According to another aspect of the present invention, the present invention provides a terminal for performing a position in a wireless communication system. The terminal may comprise: a radio frequency (RF) unit for receiving observed time difference of arrival (OTDOA) assistance data from a location server; and a processor for increasing a fast Fourier transform (FFT) sampling size if a value of a bandwidth of a positioning reference signal (PRS) included in the OTDOA assistance data is less than a first value, for processing a plurality of received PRSs by using the increased FFT sampling size, and for calculating a reference signal time difference (RSTD) between the plurality of received PRSs.

In the increasing of the FFT sampling size, if the bandwidth value of the PRS is 1.4 MHz, the FFT sampling size may be increased from 128 to 256, 512, or 1024.

In the increasing of the FFT sampling size, if the bandwidth value of the PRS is 3 MHz, the FFT sampling size may be increased from 256 to 512 or 1024.

In the increasing of the FFT sampling size, a zero-bit may be filled between N pieces of data of the PRS signal.

If the bandwidth value of the PRS is 1.4 MHz, a sampling rate may be decreased from 16 Ts to 8 Ts or 4 Ts by increasing the FFT sampling size.

According to an embodiment of the present invention, a location can be measured with an improved accuracy.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. The IEEE 802.16m is evolved from the IEEE 802.16e, and provides backward compatibility with a system based on the IEEE 802.16e. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is evolved from the 3GPP LTE.

Although the following description focuses on LTE-A for clarity, the technical features of the present invention are not limited thereto.

Figure 1:
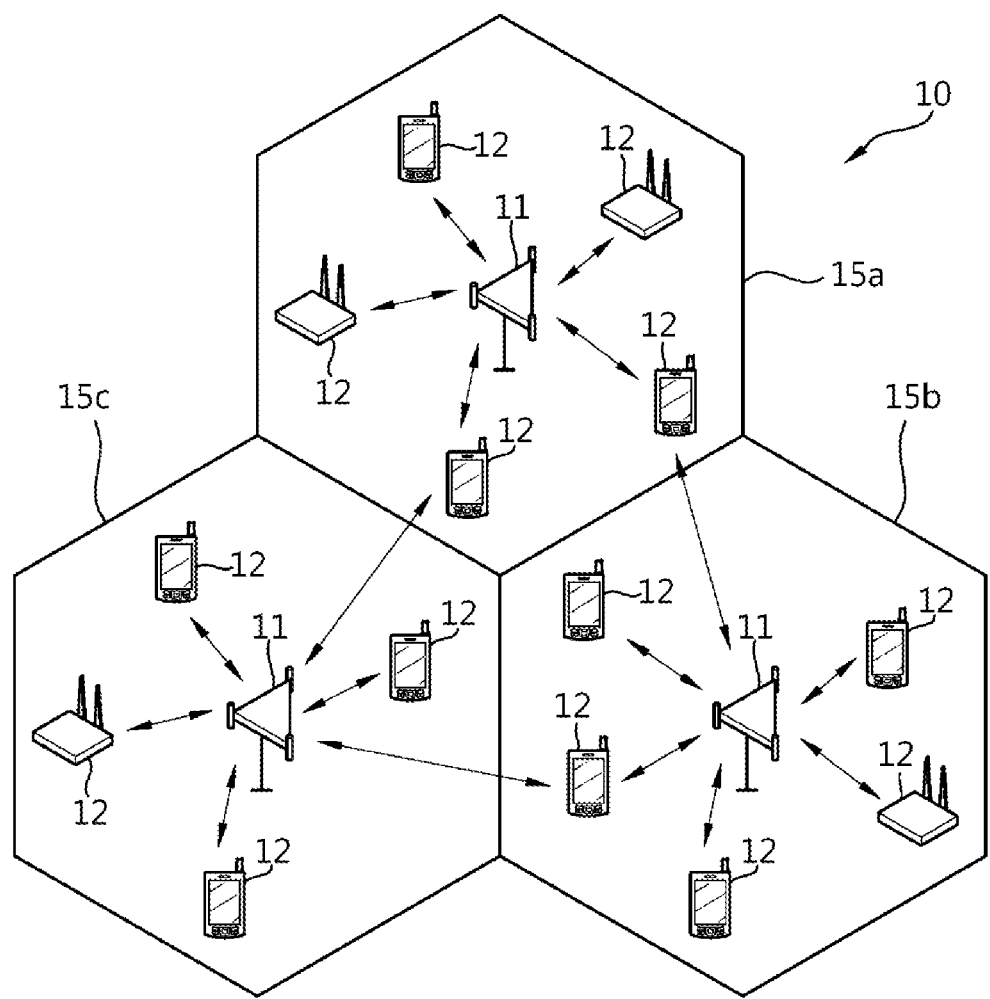
FIG. 1 shows a wireless communication system.

FIG. 1 shows a wireless communication system.

Referring to FIG. 1, a wireless communication system 10 includes at least one base station (BS) 11. Respective BSs 11 provide communication services to specific geographical regions (generally referred to as cells) 15a, 15b, and 15c. The cell can be divided into a plurality of regions (referred to as sectors). A user equipment (UE) 12 may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

The UE belongs to one cell in general. A cell to which the UE belongs is called a serving cell. A BS which provides a communication service to the serving cell is called a serving BS. Since the wireless communication system is a cellular system, there may be a different cell adjacent to the serving cell. The different cell adjacent to the serving cell is called a neighboring cell. A BS which provides a communication service to the adjacent cell is called a neighbor BS. The serving cell and the neighbor cell are determined relatively with respect to the UE.

This technique can be used in a downlink or an uplink. In general, a downlink implies communication from the BS 11 to the UE 12, and an uplink implies communication from the UE 12 to the BS 11. In the downlink, a transmitter may be a part of the BS 11, and a receiver may be a part of the UE 12. In the uplink, the transmitter may be a part of the UE 12, and the receiver may be a part of the BS 11.

The wireless communication system may be any one of a multiple-input multiple-output (MIMO) system, a multiple-input single-output (MISO) system, a single-input single-output (SISO) system, or a single-input multiple-output (SIMO) system. The MIMO system uses a plurality of transmit (Tx) antennas and a plurality of receive (Rx) antennas. The MISO system uses a plurality of Tx antennas and one Rx antenna. The SISO system uses one Tx antenna and one Rx antenna. The SIMO system uses one Tx antenna and a plurality of Rx antennas. Hereinafter, a Tx antenna implies a physical or logical antenna used to transmit one signal or stream. An Rx antenna implies a physical or logical antenna used to receive one signal or stream.

Figure 2:
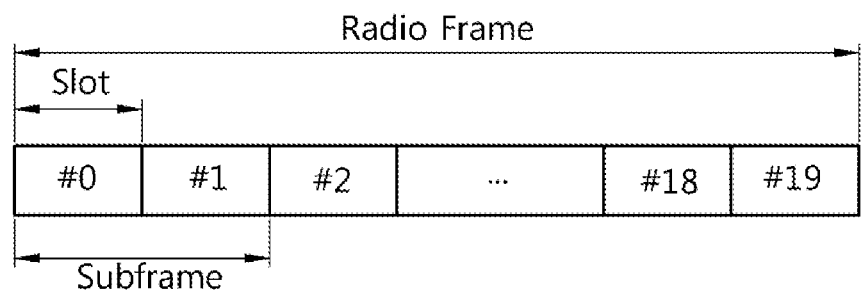
FIG. 2 shows a structure of a radio frame in $3^{rd}$ generation partnership project (3GPP) long term evolution (LTE).

FIG. 2 shows a structure of a radio frame in 3GPP LTE.

The section 5 of 3GPP ($3^{rd}$ Generation Partnership Project) TS 36.211 V8.2.0 (2008-03) "Technical Specification Group Radio Access Network; Evolved Universal Terrestrial Radio Access (E-UTRA); Physical channels and modulation (Release 8)" can be incorporated herein by reference. Referring to FIG. 2, the radio frame consists of 10 subframes. One subframe consists of two slots. Slots included in the radio frame are numbered with slot numbers #0 to #19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

One slot includes a plurality of orthogonal frequency division multiplexing (OFDM) symbols in a time domain, and includes a plurality of subcarriers in a frequency domain. Since the 3GPP LTE uses OFDMA in downlink transmission, the OFDM symbol is for representing one symbol period, and can be referred to as other terms. For example, the OFDM symbol can also be referred to as an SC-FDMA symbol when SC-FDMA is used as an uplink multiple-access scheme. A resource block (RB) is a resource allocation unit, and includes a plurality of consecutive subcarriers in one slot. The above radio frame structure is shown for exemplary purposes only. Thus, the number of subframes included in the radio frame, the number of slots included in the subframe, or the number of OFDM symbols included in the slot may change variously.

In 3GPP LTE, it is defined such that one slot includes 7 OFDM symbols in a normal cyclic prefix (CP) and one slot includes 6 OFDM symbols in an extended CP.

A wireless communication system can be briefly classified into a system based on a frequency division duplex (FDD) scheme and a system based on a time division duplex (TDD) scheme. In the FDD scheme, uplink transmission and downlink transmission are achieved while occupying different frequency bands. In the TDD scheme, uplink transmission and downlink transmission are achieved at different times while occupying the same frequency band. A channel response based on the TDD scheme is reciprocal in practice. This implies that a downlink channel response is almost identical to an uplink channel response in a given frequency domain.

Therefore, in a TDD-based wireless communication system, the downlink channel response can be advantageously obtained from the uplink channel response. In the TDD scheme, a full frequency band is time-divided into uplink transmission and downlink transmission, and thus downlink transmission performed by a BS and uplink transmission performed by a UE can be simultaneously achieved. In a TDD system in which uplink transmission and downlink transmission are divided on a subframe basis, uplink transmission and downlink transmission are performed in different subframes.

Figure 3:
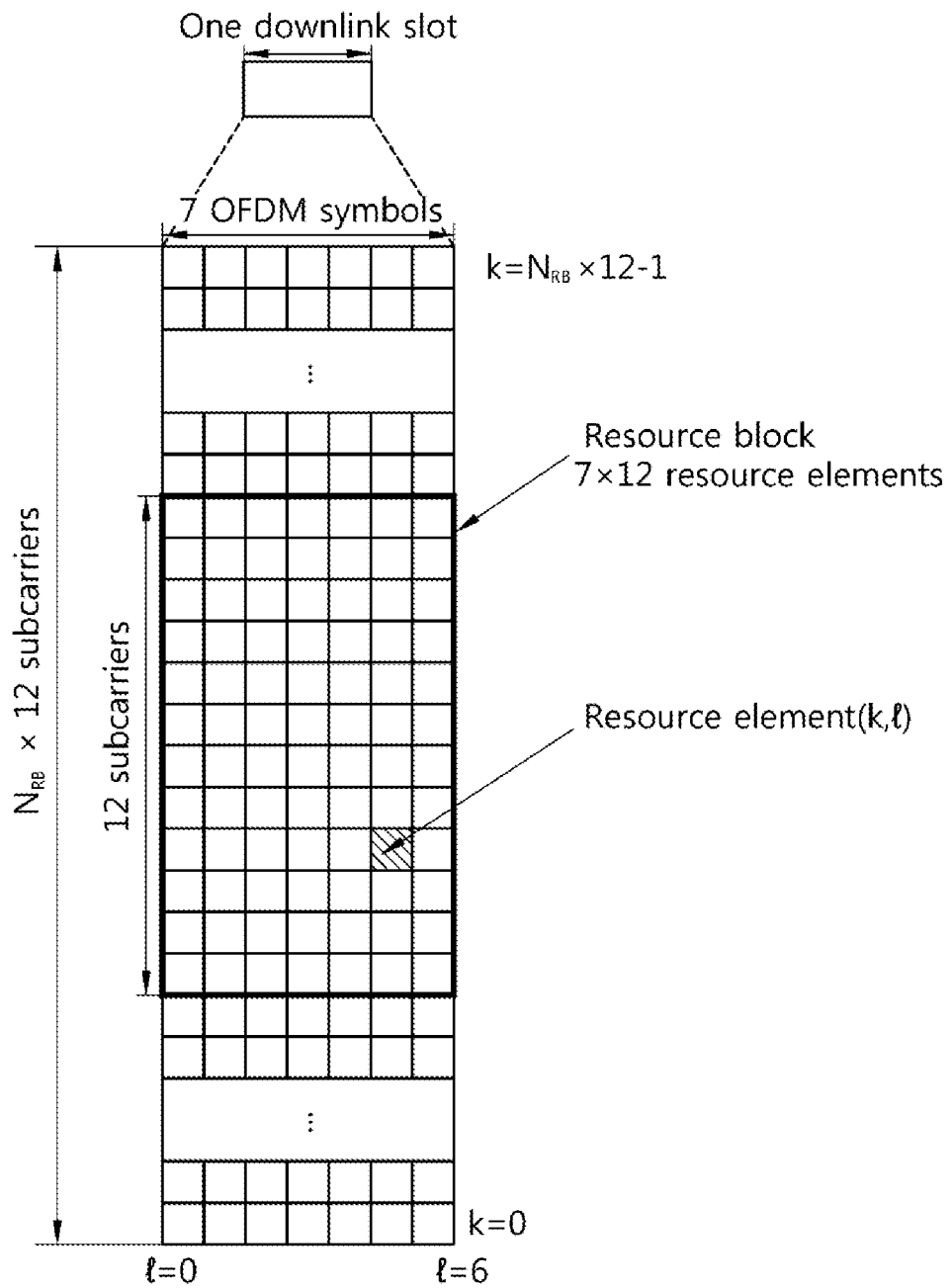
FIG. 3 shows an example of a resource grid for one downlink slot.

FIG. 3 shows an example of a resource grid for one downlink slot.

The downlink slot includes a plurality of OFDM symbols in a time domain, and includes $N_{RB}$ resource blocks (RBs) in a frequency domain. The number $N_{RB}$ of RBs included in the downlink slot depends on a downlink transmission bandwidth configured in a cell. For example, in the LTE system, $N_{RB}$ may be any one value in the range of 60 to 110. One RB includes a plurality of subcarriers in a frequency domain. A structure of an uplink slot may be the same as the aforementioned structure of the downlink slot.

Each element on the resource grid is referred to as a resource element (RE). The RE on the resource grid can be identified by an index pair (k,l) within the slot. Herein, $k(k=0, \ldots, N_{RB} \times 12-1)$ denotes a subcarrier index in the frequency domain, and $l(l=0, \ldots, 6)$ denotes an OFDM symbol index in the time domain.

Although it is described herein that one RB consists of 7 OFDM symbols in the time domain and 12 subcarriers in the frequency domain and thus includes 7×12 REs, this is for exemplary purposes only. Therefore, the number of OFDM symbols and the number of subcarriers in the RB are not limited thereto. The number of OFDM symbols and the number of subcarriers may change variously depending on a CP length, a frequency spacing, etc. For example, the number of OFDM symbols is 7 in a normal CP case, and the number of OFDM symbols is 6 in an extended CP case. The number of subcarriers in one OFDM symbol may be selected from 128, 256, 512, 1024, 1536, and 2048.

Figure 4:
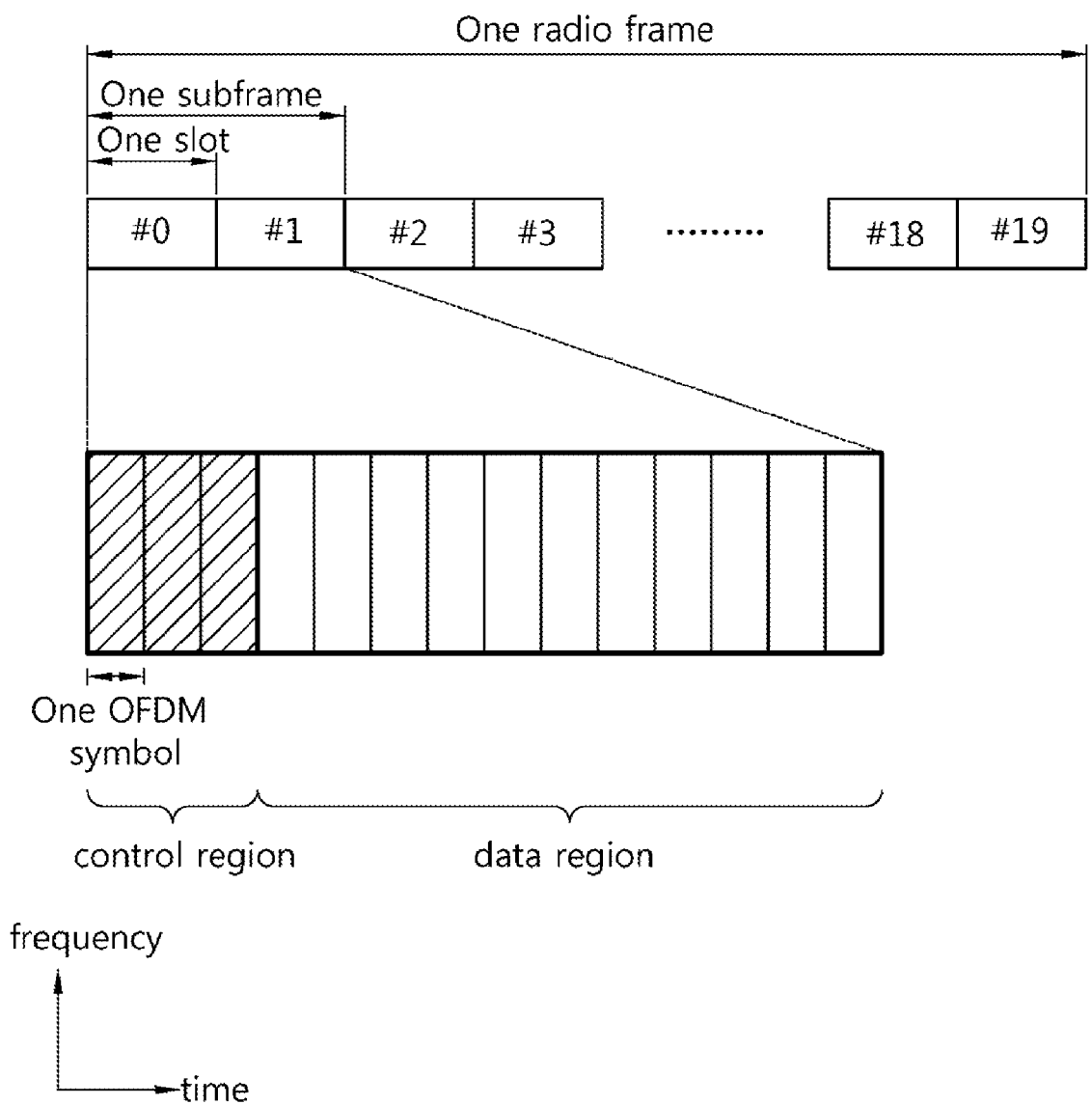
FIG. 4 shows a structure of a downlink subframe.

FIG. 4 shows a structure of a downlink subframe.

The downlink subframe includes two slots in a time domain. Each slot includes 7 OFDM symbols in a normal CP case. Up to three OFDM symbols (i.e., in case of 1.4 MHz bandwidth, up to 4 OFDM symbols) located in a front portion of a first slot within the subframe correspond to a control region, and the remaining OFDM symbols correspond to a data region. Herein, control channels are allocated to the control region, and a physical downlink shared channel (PDSCH) is allocated to the data region.

A physical downlink control channel (PDCCH) can carry a downlink shared channel (DL-SCH)'s resource allocation and transmission format, uplink shared channel (UL-SCH)'s resource allocation information, paging information on a paging channel (PCH), system information on a DL-SCH, a resource allocation of a higher layer control message such as a random access response transmitted through a PDSCH, a transmission power control command for individual UEs included in any UE group, activation of a voice over Internet (VoIP), etc. A plurality of PDCCHs can be transmitted in the control region, and the UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups. A format of the PDCCH and the number of bits of the available PDCCH are determined according to a correlation between the number of CCEs and the coding rate provided by the CCEs.

A BS determines a PDCCH format according to downlink control information (DCI) to be transmitted to a UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for a system information block (SIB), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 5:
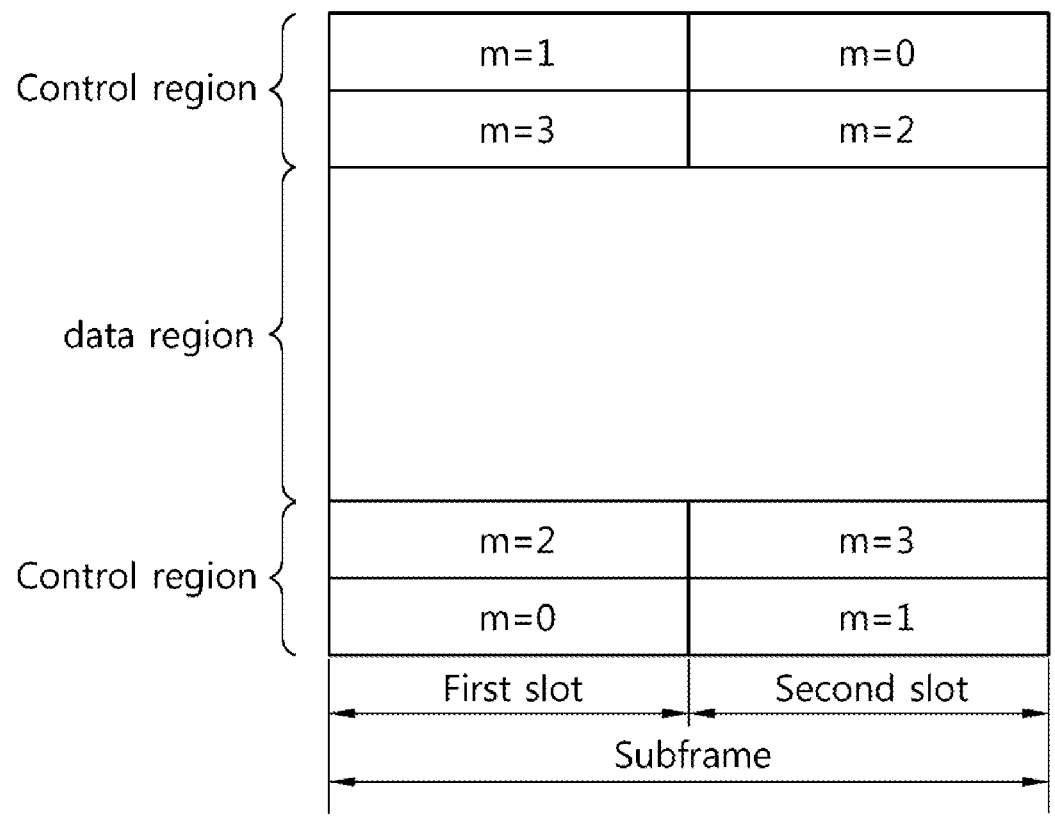
FIG. 5 shows a structure of an uplink subframe.

FIG. 5 shows a structure of an uplink subframe.

The uplink subframe can be divided into a control region and a data region. A physical uplink control channel (PUCCH) for carrying uplink control information is allocated to the control region. A physical uplink shared channel (PUSCH) for carrying data is allocated to the data region. When indicated by a higher layer, a UE can support simultaneous transmission of the PUSCH and the PUCCH.

The PUCCH for one UE is allocated in an RB pair in a subframe. RBs belonging to the RB pair occupy different subcarriers in each of a first slot and a second slot. That is, a frequency occupied by the RBs belonging to the RB pair to which the PUCCH is allocated changes at a slot boundary. This is called that the RB pair allocated to the PUCCH is frequency-hopped at the slot boundary. Since the UE transmits the uplink control information on a time basis through different subcarriers, a frequency diversity gain can be obtained. m is a location index indicating a logical frequency domain location of a RB pair allocated to a PUCCH in a subframe.

Examples of the uplink control information transmitted on a PUCCH include hybrid automatic repeat request (HARQ), acknowledgement (ACK)/non-acknowledgement (NACK), channel state information (CSI) indicating a DL channel state, scheduling request (SR) which is a UL radio resource allocation request, etc.

The PUSCH is mapped to an uplink shared channel (UL-SCH) which is a transport channel. Uplink data transmitted through the PUSCH may be a transport block which is a data block for the UL-SCH transmitted during a TTI. The transport block may be user information. In addition, the uplink data may be multiplexed data. The multiplexed data may be obtained by multiplexing the control information and a transport block for the UL-SCH. Examples of the control information to be multiplexed with data may include a channel quality indicator (CQI), a precoding matrix indicator (PMI), HARQ, a rank indicator (RI), etc. Alternatively, the uplink data may consist of only the control information.

Hereinafter, a reference signal (RS) is described.

In general, the RS is transmitted as a sequence. Any sequence can be used as a sequence used for an RS sequence without particular restrictions. The RS sequence may be a phase shift keying (PSK)-based computer generated sequence. Examples of the PSK include binary phase shift keying (BPSK), quadrature phase shift keying (QPSK), etc. Alternatively, the RS sequence may be a constant amplitude zero auto-correlation (CAZAC) sequence. Examples of the CAZAC sequence include a Zadoff-Chu (ZC)-based sequence, a ZC sequence with cyclic extension, a ZC sequence with truncation, etc. Alternatively, the RS sequence may be a pseudo-random (PN) sequence. Examples of the PN sequence include an m-sequence, a computer generated sequence, a Gold sequence, a Kasami sequence, etc. In addition, the RS sequence may be a cyclically shifted sequence.

A downlink RS can be classified into a cell-specific RS (CRS), a multimedia broadcast and multicast single frequency network (MBSFN) RS, a UE-specific RS, a positioning RS (PRS), and a channel state information (CSI) RS (CSI-RS). The CRS is an RS transmitted to all UEs in a cell, and can be used in both data demodulation and channel estimation. The CRS can be transmitted in all downlink subframes in a cell supporting PDSCH transmission. The MBSFN RS is an RS for providing a multimedia broadcast multicast service (MBMS), and can be transmitted in a subframe allocated for MBSFN transmission. The MBSFN RS can be defined only in an extended cyclic prefix (CP) configuration. The UE-specific RS is an RS received by a specific UE or a specific UE group in the cell, and can also be called a dedicated RS (DRS). Alternatively, the UE-specific RS can also be called a demodulation RS (DMRS) since it is primarily used in data demodulation of a specific UE or a specific UE group. The CSI-RS can be used for estimation of channel state information in a 3GPP LTE-A system. The CSI-RS is relatively sparsely arranged in a frequency domain or a time domain. The CSI-RS can be punctured in a data region of a normal subframe or an MBSFN subframe. If required, a channel quality indicator (CQI), a precoding matrix indicator (PMI), a rank indicator (RI), etc., can be reported from the UE through CSI estimation. The CSI-RS can be transmitted through 1, 2, 4, or 8 antenna ports.

The PRS is an RS defined for UE location estimation. The PRS can be transmitted through a resource block in a downlink subframe configured for PRS transmission. The downlink subframe configured for PRS transmission can also be called a positioning subframe. If the normal subframe and the MBSFN subframe are both configured as positioning subframes in a cell, an OFDM symbol configured for PRS transmission in the MBSFN subframe uses the same CP configuration as that used in a first subframe of a radio frame. If only the MBSFN subframe is configured as the positioning subframe in the cell, the OFDM symbol configured for PRS transmission uses an extended CP configuration. The PRS is not mapped to a resource element to which a physical broadcast channel (PBCH), a primary synchronization signal (PSS), or a secondary synchronization signal (SSS) is mapped. In addition, the PRS can be defined for $\Delta f = 15$ kHz.

A PRS sequence can be defined by Equation 1 below.

$$r_{l,n_s}(m) = \frac{1}{\sqrt{2}}(1 - 2 \cdot c(2m)) + j\frac{1}{\sqrt{2}}(1 - 2 \cdot c(2m+1)) \quad \text{[Equation 1]}$$

In Equation 1, $n_s$ denotes a slot number in a radio frame, and l denotes an OFDM symbol number in a slot. m is 0, 1, ..., $2N_{RB}^{max,DL}-1$. $2N_{RB}^{max,DL}$ denotes the number of resource blocks corresponding to a maximum bandwidth in a downlink. For example, $2N_{RB}^{max,DL}$ is 110 in 3GPP LTE. c(i) is a PN sequence and is a pseudo-random sequence. The PN sequence can be defined by a length-31 gold sequence. Equation 2 shows an example of the gold sequence c(n).

$c(n) = (x_1(n+N_C) + x_2(n+N_C)) \bmod 2$ $x_1(n+31) = (x_1(n+3) + x_1(n)) \bmod 2$ $x_2(n+31) = (x_2(n+3) + x_2(n+2) + x_2(n+1) + x_2(n)) \bmod 2$ [Equation 2]

Herein, Nc is 1600, x(i) is a first m-sequence, and y(i) is a second m-sequence. For example, the first m-sequence or the second m-sequence can be initialized in each OFDM symbol according to a cell ID, a slot number in a radio frame, an OFDM symbol index in a slot, a CP type, etc. A pseudo-random sequence generator can be initialized as $c_{init} = 2^{10} \cdot (7 \cdot (n_s+1)+l+1) \cdot (2 \cdot N_{ID}^{cell}+1) + 2 \cdot N_{ID}^{cell} + N_{CP}$ at the start of each radio frame. In a normal CP case, $N_{CP}$ is 1. In an extended CP case, $N_{CP}$ is 0.

A PRS sequence $r_{l,n_s}(m)$ can be mapped to a complex modulation symbol $a_{k,l}^{(p)}$ in a slot $n_s$ according to Equation 3.

$$a_{k,l}^{(p)} = r_{l,n_s}(m') \quad \text{[Equation 3]}$$

In the normal CP case, k, l, m, m' of Equation 3 can be determined by Equation 4.

$$k = 6(m + N_{RB}^{DL} - N_{RB}^{PRS}) + (6 - l + v_{shift}) \bmod 6 \quad \text{[Equation 4]}$$

$$l = \begin{cases} 3, 5, 6 & \text{if } n_s \bmod 2 = 0 \\ 1, 2, 3, 5, 6 & \text{if } n_s \bmod 2 = 1 \text{ and} \\ & (1 \text{ or } 2 \text{ } PBCH \text{ antenna ports}) \\ 2, 3, 5, 6 & \text{if } n_s \bmod 2 = 1 \text{ and} \\ & (4 \text{ } PBCH \text{ antenna ports}) \end{cases}$$

$m = 0, 1, \ldots, 2 \cdot N_{RB}^{PRS} - 1$ $m' = m + N_{RB}^{max,DL} - N_{RB}^{PRS}$ In the extended CP case, k, l, m, m' of Equation 3 can be determined by Equation 5.

$$k = 6(m + N_{RB}^{DL} - N_{RB}^{PRS}) + (5 - l + v_{shift}) \bmod 6 \quad \text{[Equation 5]}$$

$$l = \begin{cases} 4, 5 & \text{if } n_s \bmod 2 = 0 \\ 1, 2, 4, 5 & \text{if } n_s \bmod 2 = 1 \text{ and} \\ & (1 \text{ or } 2 \text{ } PBCH \text{ antenna ports}) \\ 2, 4, 5 & \text{if } n_s \bmod 2 = 1 \text{ and} \\ & (4 \text{ } PBCH \text{ antenna ports}) \end{cases}$$

$m = 0, 1, \ldots, 2 \cdot N_{RB}^{PRS} - 1$ $m' = m + N_{RB}^{max,DL} - N_{RB}^{PRS}$ In Equation 4 or Equation 5, $N_{RB}^{PRS}$ can be configured by higher layers, and a cell-specific frequency shift $v_{shift}$ can be given as $v_{shift} = N_{cell}^{ID} \bmod 6$.

Figure 6:
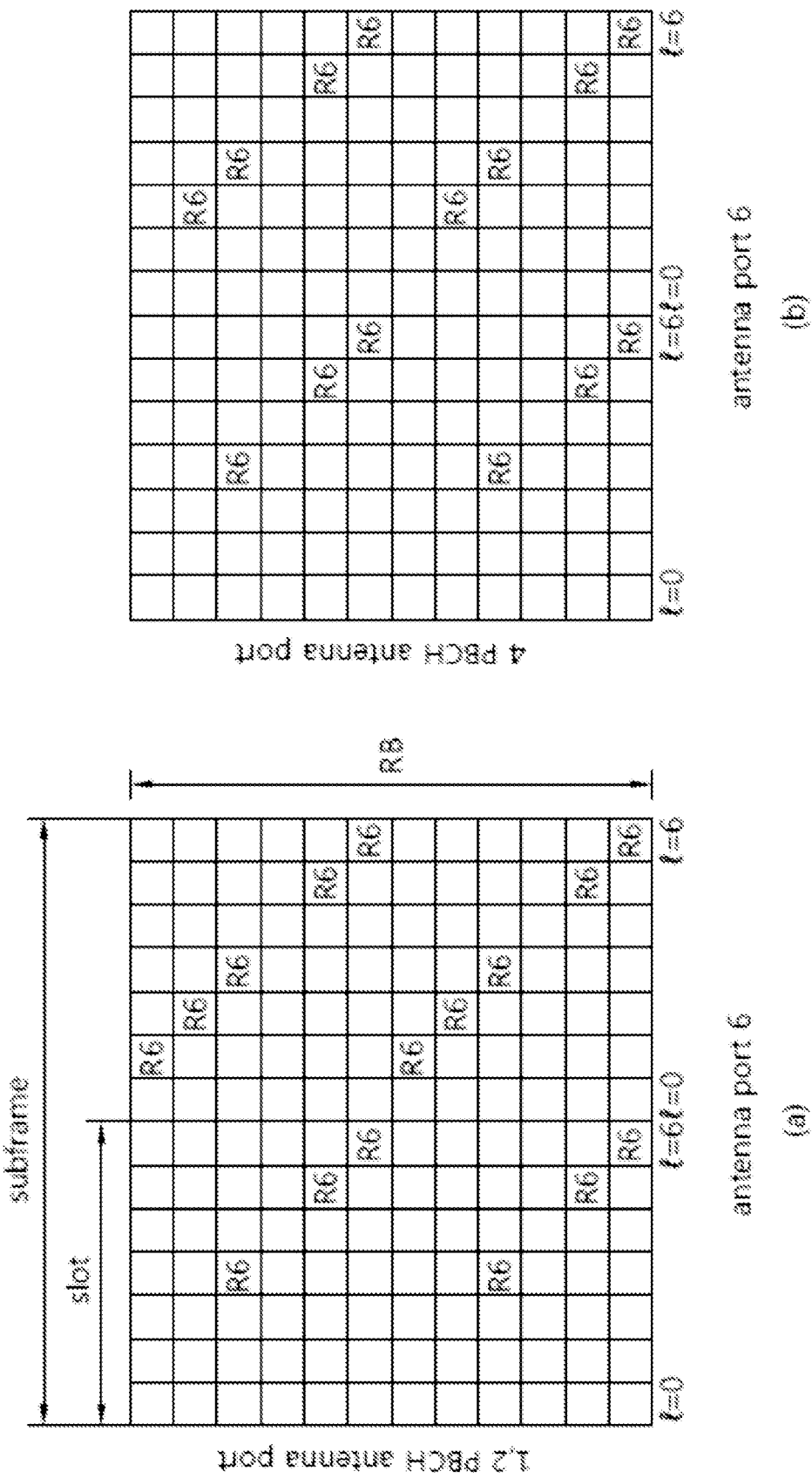
FIG. 6 and FIG. 7 show an example of a positioning reference signal (PRS) pattern mapped to a resource block.
Figure 7:
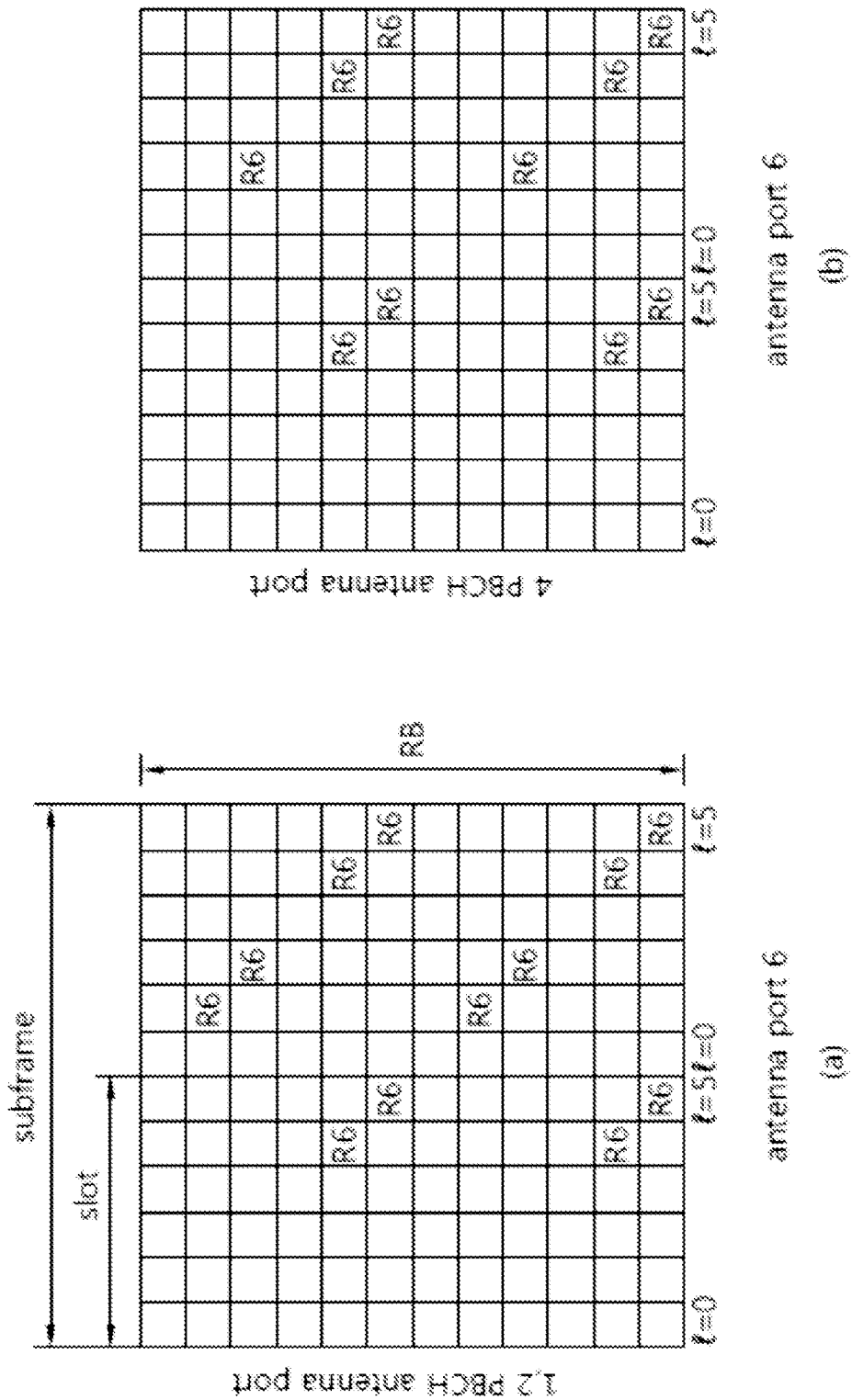

FIG. 6 and FIG. 7 show an example of a PRS pattern mapped to a resource block.

FIG. 6 shows a case of mapping a PRS to a resource block in a normal CP case. FIG. 6A shows a PRS pattern when the number of PBCH antenna ports is 1 or 2. FIG. 6B shows a PRS pattern when the number of PBCH antenna ports is 4. FIG. 7 shows a case of mapping a PRS to a resource block in an extended CP case. FIG. 7A shows a PRS pattern when the number of PBCH antenna ports is 1 or 2. FIG. 7B shows a PRS pattern when the number of PBCH antenna ports is 4. The PRS is mapped to a diagonal pattern in a resource block.

Table 1 shows a cell-specific subframe configuration period $T_{PRS}$ and a cell-specific subframe offset $\Delta_{PRS}$. A PRS configuration index $I_{PRS}$ can be given by a higher layer. The PRS can be transmitted only in a downlink subframe configured for PRS transmission. The PRS cannot be transmitted in a special subframe of a TDD system. The PRS can be transmitted in $N_{PRS}$ consecutive downlink subframes, and $N_{PRS}$ can be given by the higher layer.

In Equation 4 or Equation 5, $N_{RB}^{PRS}$ can be configured by higher layers, and a cell-specific frequency shift $v_{shift}$ can be given as $v_{shift} = N_{cell}^{ID} \mod 6$.

FIG. 6 and FIG. 7 show an example of a PRS pattern mapped to a resource block.

FIG. 6 shows a case of mapping a PRS to a resource block in a normal CP case. FIG. 6A shows a PRS pattern when the number of PBCH antenna ports is 1 or 2. FIG. 6B shows a PRS pattern when the number of PBCH antenna ports is 4. FIG. 7 shows a case of mapping a PRS to a resource block in an extended CP case. FIG. 7A shows a PRS pattern when the number of PBCH antenna ports is 1 or 2. FIG. 7B shows a PRS pattern when the number of PBCH antenna ports is 4. The PRS is mapped to a diagonal pattern in a resource block.

Table 1 shows a cell-specific subframe configuration period $T_{PRS}$ and a cell-specific subframe offset $\Delta_{PRS}$. A PRS configuration index $I_{PRS}$ can be given by a higher layer. The PRS can be transmitted only in a downlink subframe configured for PRS transmission. The PRS cannot be transmitted in a special subframe of a TDD system. The PRS can be transmitted in $N_{PRS}$ consecutive downlink subframes, and $N_{PRS}$ can be given by the higher layer.

TABLE 1

| PRS configuration Index $I_{PRS}$ | PRS periodicity (subframes) $T_{PRS}$ | PRS subframe offset 2 (subframes) |
| --- | --- | --- |
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-4095 | Reserved | Reserved |

A method of estimating a location of a UE can be classified into a GPS-based method and a terrestrial positioning-based method. The terrestrial positioning-based method estimates the location of the UE by using a timing difference of signals transmitted from BSs. Signals must be received from at least three BSs. Although this method has a lower location estimation performance in comparison with the GPS-based method, this method can be used in most of environments. A signal received from the BS may be a synchronization signal or a reference signal (RS).

Figure 8:
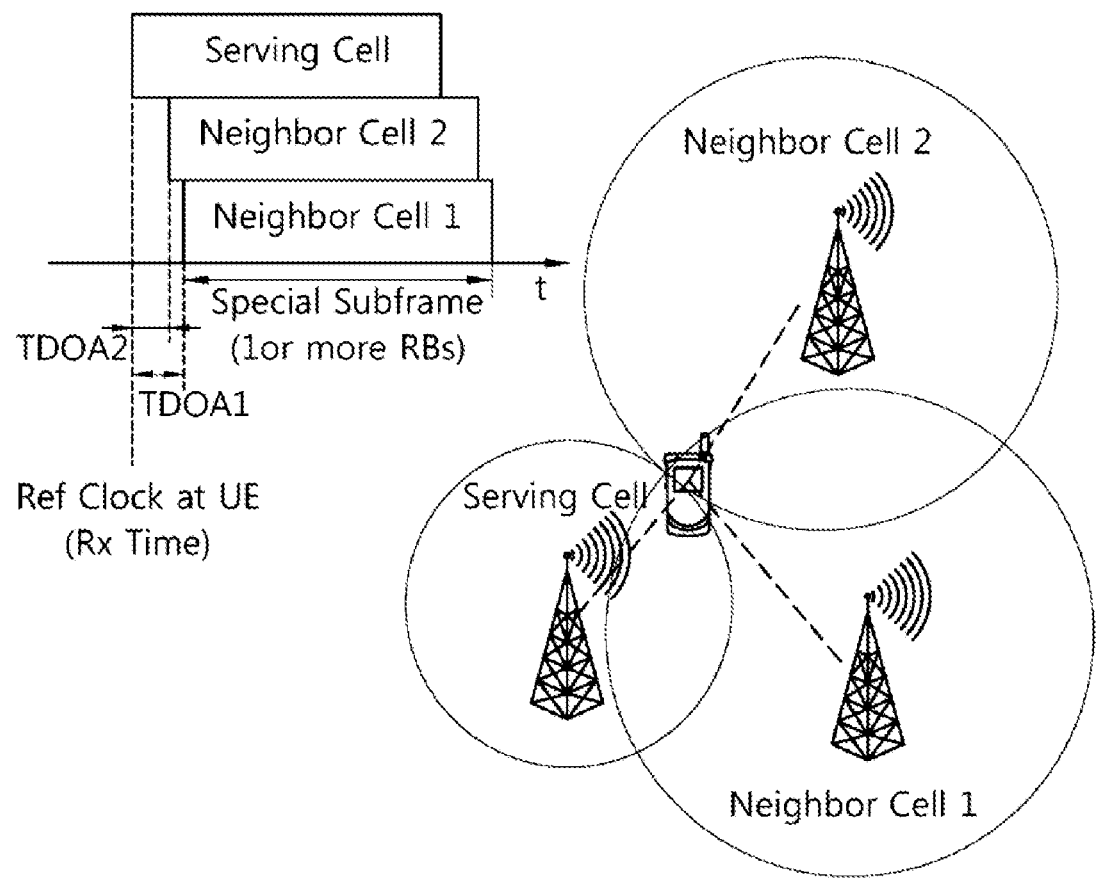
FIG. 8 shows an example of operating an observed time difference of arrival (OTDOA) method as a terrestrial positioning-based method.

FIG. 8 shows an example of operating an observed time difference of arrival (OTDOA) method as a terrestrial positioning-based method. A UE measures a reference clock on the basis of a subframe transmitted in a serving cell from which a current service is received. A subframe is received from a neighbor cell 2 at a time elapsed by a TDOA 2 from the reference clock. A subframe is received from a neighbor cell 1 at a time elapsed by a TDOA 1, longer than the TDOA 2, from the reference clock. A PRS may be included in each subframe transmitted from multiple cells.

The UE can estimate the location of the UE according to a difference in a reception time of a PRS transmitted from the serving cell and the neighbor cell. A reference signal time difference (RSTD) between a neighbor cell j and a reference cell i can be defined as $T_{subframeRxj} - T_{subframeRxi}$, and can be found in the section 5.1.12 of 3GPP TS 36.214 V9.1.0 (2010-03) 5.1.12. $T_{subframeRxj}$ denotes a time at which the UE receives a start part of one subframe from the cell j. $T_{subframeRxi}$ denotes a time at which a start part of corresponding one subframe is received from the cell i, which is the closest in time to the subframe received from the cell j by the UE. A reference point for measuring the RSTD may be an antenna connector of the UE.

Figure 9:
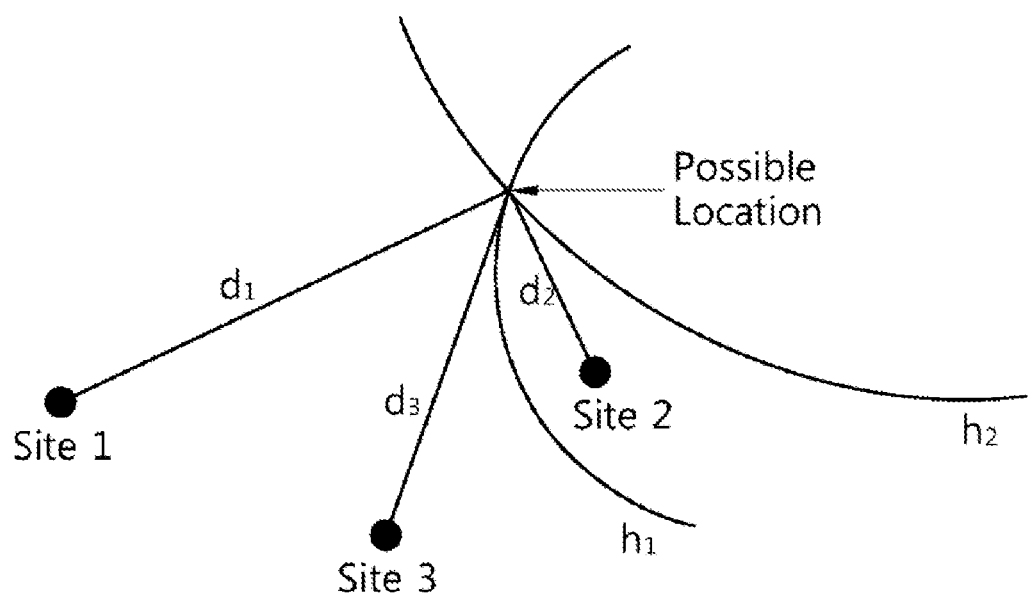
FIG. 9 shows another example of operating a downlink OTDOA method as a terrestrial positioning-based method.

FIG. 9 shows another example of operating a downlink OTDOA method as a terrestrial positioning-based method. A location of a UE can be estimated by solving a linearized equation by the use of a Taylor series expansion. This can be found in [Y. Chan and K. Ho, "A simple and efficient estimator for hyperbolic location," IEEE Trans. Signal Processing, vol. 42, pp. 1905-1915, August 1994].

If the location of the UE is estimated by using the downlink OTDOA method, the UE and an enhanced serving mobile location center (E-SMLC) can mutually exchange information according to an LTE positioning protocol (LPP). The UE can measure OTDOA of RSs transmitted by multiple BSs and transmit a measurement result to the E-SMLC through the LPP. The E-SMLC can transmit assistance data required by the UE for the measurement to the UE through the LPP.

Figure 10:
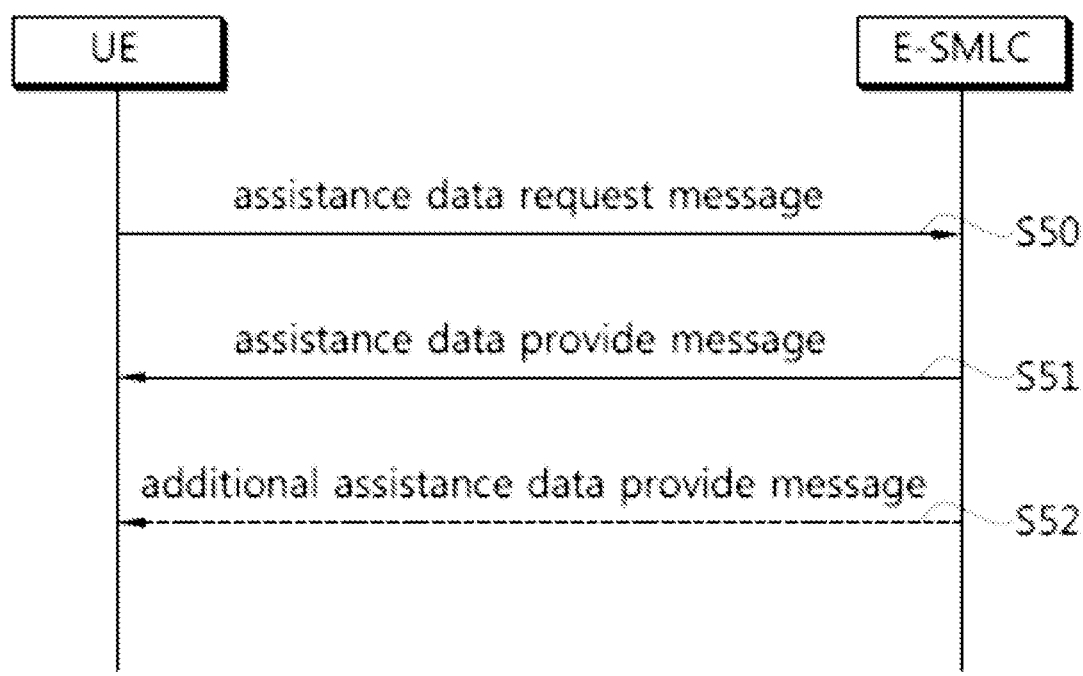
FIG. 10 shows an example of an assistance data exchange process between a user equipment (UE) and an enhanced serving mobile location center (E-SMLC) through an LTE positioning protocol (LPP).

FIG. 10 shows an example of an assistance data exchange process between a UE and an E-SMLC through an LPP. Through the assistance data exchange process, the UE can request the E-SMLC to transmit assistance data required for location estimation, and can receive the assistance data from the E-SMLC. This can be found in the section 5.2.1 of 3GPP TS36.355 V9.2.1(2010-06).

In step S50, the UE transmits an assistance data request message to the E-SMLC. In step S51, the E-SMLC transmits an assistance data provide message including the assistance data to the UE. The transmitted assistance data may be matched to the assistance data request message requested by the UE or may be a subset of the message. In step S52, the E-SMLC can transmit one or more additional assistance data provide messages including additional assistance data to the UE. The additional assistance data may also be matched to the assistance data request message requested by the UE or may be a subset of the message. Meanwhile, a finally transmitted assistance data provide message may include information indicating the end of the assistance data exchange.

In the downlink OTDOA method, the assistance data provide message can be transmitted using an OTDOA-ProvideAssistanceData information element (IE). Table 2 shows an example of the OTDOA-ProvideAssistanceData IE. This can be found in the section 6.5.1 of 3GPP TS36.355 V9.4.0(2010-12).

TABLE 2

ASN1START OTDOA-ProvideAssistanceData ::= SEQUENCE {
otdoa-ReferenceCellInfo OTDOA-ReferenceCellInfo OPTIONAL,
otdoa-NeighbourCellInfo OTDOA-NeighbourCellInfoList OPTIONAL,
otdoa-Error OTDOA-Error OPTIONAL,...}-- ASN1STOP Referring to Table 2, the OTDOA-ProvideAssistanceData IE includes an OTDOA-ReferenceCellInfo IE and an OTDOA-NeighbourCellInfoList IE. In this case, if the UE cannot acquire any SFN from any cell, a criterion for OTDOA measurement cannot be determined, and thus OTDOA measurement cannot be performed, thereby disabling UE location estimation. Therefore, a solution of this problem can be proposed by defining at least one cell for which an SFN can be obtained by the UE or by including it to a neighbor cell list.

Table 3 shows an example of the OTDOA-ReferenceCellInfo IE. The E-SMLC can transmit information of a reference cell used as a criterion of OTDOA measurement to the UE according to the OTDOA-ReferenceCellInfo IE.

TABLE 3

-- ASN1START OTDOA-ReferenceCellInfo ::= SEQUENCE { physCellId INTEGER
(0..503), cellGlobalId ECGI OPTIONAL,-- Need ON earfcnRef
ARFCN-ValueEUTRAOPTIONAL,--Cond NotSameAsServ0
antennaPortConfigENUMERATED {ports1-or-2, ports4, ... } OPTIONAL, -- Cond
NotSameAsServ1 cpLength ENUMERATED { normal, extended, ... }, prsInfo
PRS-Info OPTIONAL,-- Cond PRS...}-- ASN1STOP In Table 3, the PRS-Info IE indicates a PRS configuration of a reference cell. Table 4 shows an example of the PRS-Info IE.

TABLE 4

ASN1START PRS-Info ::= SEQUENCE {prs-Bandwidth
ENUMERATED { n6, n15, n25, n50, n75, n100, ... }, prs-
ConfigurationIndex INTEGER (0..4095), numDL-Frames
ENUMERATED {sf-1, sf-2, sf-4, sf-6, ...},...

In Table 4, a prs-Bandwidth field indicates a bandwidth used for PRS transmission. The prs-Bandwidth field can indicate the number of resource blocks for PRS transmission. A prs-ConfigurationIndex field indicates a PRS configuration index $I_{PRS}$ of Table 1. A numDL-Frames field indicates the number $N_{PRS}$ of consecutive downlink subframes in which the PRS is transmitted. A value of the numDL-Frames field may be 1, 2, 4, or 6.

Table 5 shows an example of an OTDOA-NeighbourCellInfoList IE. The E-SMLC can transmit neighbor cell information required for OTDOA measurement to the UE according to the OTDOA-NeighbourCellInfo IE. In the OTDOA-NeighbourCellInfoList IE, information on each neighbor cell can be sorted in a descending order of importance of neighbor cells measured by the UE. That is, in OTDOA measurement, a neighbor cell having a highest priority may be a first cell. The UE measures the OTDOA according to an order of cells in the OTDOA-NeighbourCellInfoList IE provided by the E-SMLC. Meanwhile, in the OTDOA-NeighbourCellInfoList IE, a slotNumberOffset field and an expectedRSTD field can be defined relatively for each cell on the basis of a reference cell.

Referring to Table 5, OTDOA neighbor cell information of each neighbor cell includes a PRS-Info IE similarly to the OTDOA-ReferenceCellInfo IE of Table 3. Accordingly, PRS muting can be configured with respect to each neighbor cell.

Meanwhile, if the location of the UE is estimated by the downlink OTDOA method, the BS and the E-SMLC can mutually exchange information by an LPP annex (LPPa). The LPPa provides a control plane radio network layer signaling process between the BS and the E-SMLC.

Figure 11:
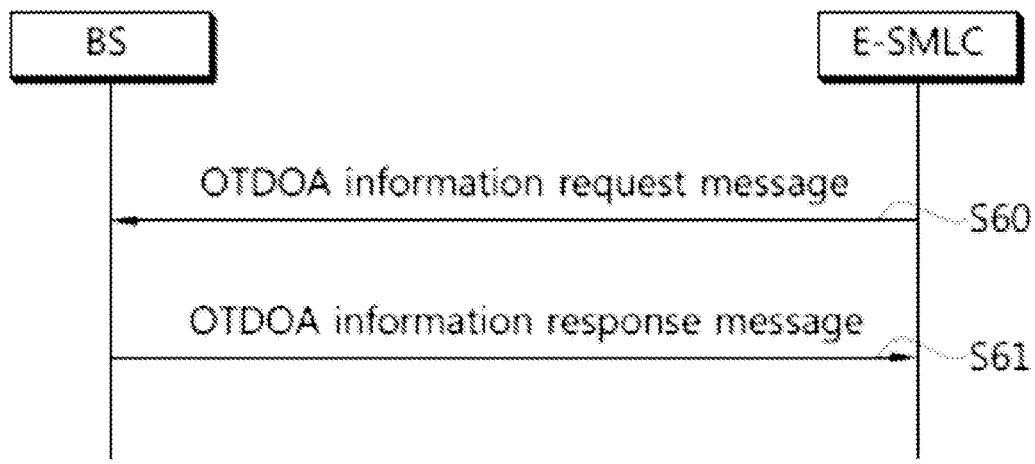
FIG. 11 shows an example of a data exchange process between a base station (BS) and an E-SMLC through an LPP annex (LPPa).

FIG. 11 shows an example of a data exchange process between a BS and an E-SMLC through an LPPa. This can be found in the section 8.2.5 of 3GPP TS36.455 V9.2.0(2010-06).

In step S60, the E-SMLC transmits an OTDOA information request message to a BS. The E-SMLC initializes the information exchange process between the E-SMLC and the BS by transmitting the OTDOA information request message. In step S61, the BS transmits an OTDOA information response message to the E-SMLC. The OTDOA information response message includes OTDOA cell information of cells related to estimation of a location of a UE.

The BS can operate by using parameters such as a PRS configuration index configured for each BS, an SFN initialization time, a PRS muting configuration, etc. Table 6 shows an example of each cell's OTDOA cell information transmitted by the UE.

TABLE 5

ASN1START OTDOA-NeighbourCellInfoList ::= SEQUENCE (SIZE
(1..maxFreqLayers)) OF OTDOA-NeighbourFreqInfo OTDOA-NeighbourFreqInfo ::=
SEQUENCE (SIZE (1..24)) OF
OTDOA-NeighbourCellInfoElement OTDOA-NeighbourCellInfoElement ::=
SEQUENCE { physCellId INTEGER (0..503), cellGlobalId ECGI OPTIONAL,--
Need ON earfcn ARFCN-ValueEUTRAOPTIONAL,-- Cond NotSameAsRef0
cpLength ENUMERATED {normal, extended, ...} OPTIONAL, -- Cond
NotSameAsRef1 prsInfo PRS-Info OPTIONAL, -- Cond NotSameAsRef2
antennaPortConfig ENUMERATED {ports-1-or-2, ports-4, ...} OPTIONAL, -- Cond
NotsameAsRef3 slotNumberOffset INTEGER(0..31) OPTIONAL,-- Cond
NotSameAsRef4 prs-SubframeOffset INTEGER (0..1279)OPTIONAL,-- Cond
InterFreq expectedRSTD INTEGER (0..16383),
expectedRSTD-UncertaintyINTEGER (0..1023),...}maxFreqLayersINTEGER ::= 3 --
ASN1STOP

TABLE 6

| IE/Group Name | Presence | Range | IE type and reference | Semantics description |
|---|---|---|---|---|
| OTDOA Cell Information |  | 1 to <maxnoOTDOAtypes> |  |  |
| >CHOICE OTDOA Cell Information Item | M |  |  |  |
| >>PCI | M |  | INTEGER (0 ... 503, ... ) | Physical Cell ID |
| >>Cell ID | M |  | ECGI 9.2.6 |  |
| >>TAC | M |  | OCTET STRING(2) | Tracking Area Code |
| >>EARFCN | M |  | INTEGER (0..65535) | Corresponds to $N_{DL}$ for FDD or $N_{DL/UL}$ for TDD |
| >>PRS Bandwidth | M |  | ENUMERATED (bw6, bw15, bw25, bw50, bw75, bw100, ... ) | Transmission bandwidth of PRS |
| >>PRS Configuration Index | M |  | INTEGER (0..4095) | PRS Configuration Index |
| >>CP Length | M |  | ENUMERATED (Normal, Extended, ... ) | CP length of PRS |
| >>Number of DL Frames | M |  | ENUMERATED (sf1, sf2, sf4, sf6,... ) | Number of consecutive downlink subframes $N_{PRS}$ in which PRS exists |
| >>Number of Antenna Ports | M |  | ENUMERATED(n1-or-n2, n4, ... ) | Number of antenna ports in use |
| >>SFN Initialisation Time | M |  | BIT STRING (64) | Time in hours, minutes, and seconds |
| >>E-UTRAN Access Point Position | M |  | 9.2.8 | Estimated geographical position of cell antenna |
| >>PRS Muting Configuration | M |  | 9.2.9 | Configuration of PRS muting pattern |

Figure 12:
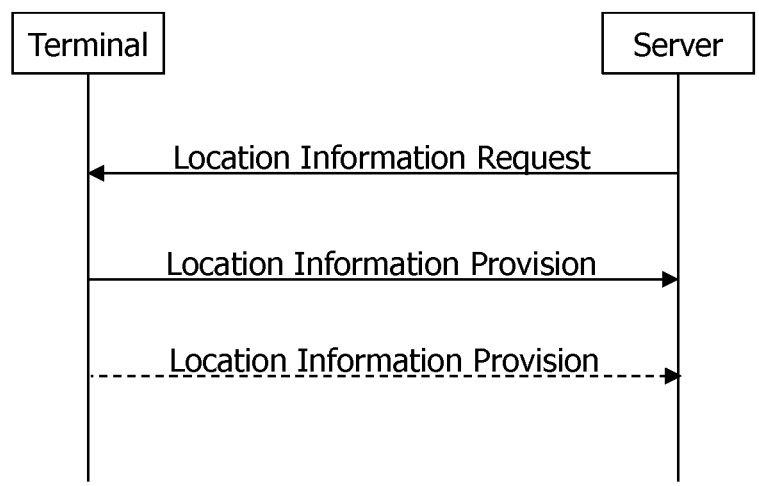
FIG. 12 is a flowchart showing an exemplary location information delivery process.

FIG. 12 is a flowchart showing an exemplary location information delivery process.

Referring to FIG. 12, a server transmits a location information request message, e.g., a Request Location Information message, to a UE. The request message may include QoS related to a type of required location information.

The UE delivers location information in response to the request. The delivered location information must coincide with the requested location information unless the server explicitly permits additional location information. If the additional location information is explicitly permitted, the UE may additionally deliver the location information.

TABLE 7

|  | Bandwidth [MHz] | | | | | |
|---|---|---|---|---|---|---|
|  | 1.4 | 3 | 5 | 10 | 15 | 20 |
| RB | 6 | 15 | 25 | 50 | 75 | 100 |

Table 8 below shows an accuracy required with respect to the number of RBs.

TABLE 8

| Parameters | PRS transmission band [RB] | The number of available subframes for measurement | Unit | Accuracy [Ts] | | Condition | |
|---|---|---|---|---|---|---|---|
| RSTD for (PRS Es/Iot)$_{ref}$ = −6 dB and (PRS Es/Iot)$_i$ = −13 dB |  | 6 | $T_s$ | — | — | −118 dBm/ 15 kHz-50 dBm/ BW$_{Channel}$ | −120 dBm/ 15 kHz-50 dBm/ BW$_{Channel}$ |
|  | 25 | 2 |  |  |  |  |  |
|  | 50, 75, 100 | 1 |  |  |  |  |  |

Figure 13:
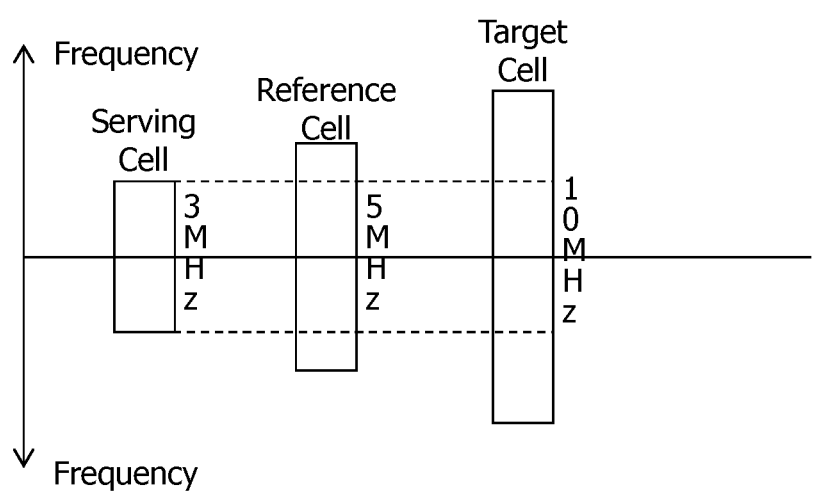
FIG. 13 shows an example in which a bandwidth allocated by a serving cell is different from a bandwidth allocated by another cell.

FIG. 13 shows an example in which a bandwidth allocated by a serving cell is different from a bandwidth allocated by another cell.

Referring to FIG. 13, it is shown an example of measuring an RSTD with respect to a reference cell to which 5 MHz is allocated for a PRS and a target cell to which 10 MHz is allocated for the PRS by a UE which belongs to a serving cell to which a bandwidth of 3 MHz is allocated for the PRS.

The number of resource blocks (RBs) corresponding to respective bandwidths is as follows.

In Table 8, it is assumed that Io has an EPRE existing across a bandwidth. Further, Ts denotes a reference time unit.

As can be seen through the above Tables, since 3 MHz corresponds to 15 RBs, an accuracy of ±15 is required as to a serving cell. Likewise, since 5 MHz corresponds to 25 RBs, an accuracy of ±6 is required as to a reference cell. In addition, since 10 MHz corresponds to 50 RBs, an accuracy of ±5 is required.

As can be seen through the above description, 3 MHz, which is less than 5 MHz, has an accuracy of ±15 Ts which is significantly low in a relative sense. As such, the accuracy is low for the following reasons.

Basically, a bandwidth is determined by: bandwidth=FFT sampling size×15 KHz.

The FFT sampling size is as follows.

TABLE 9

| Channel BW | FFT sampling size | Ts |
| --- | --- | --- |
| 1.4 MHz | 128 | 1/(128 * 15 KHz) |
| 3 MHz | 256 | 1/(256 * 15 KHz) |
| 5 MHz | 512 | 1/(512 * 15 KHz) |
| 10 MHz | 1024 | 1/(1024 * 15 KHz) |
| 15 MHz | 1536 | 1/(1536 * 15 KHz) |
| 20 MHz | 2048 | 1/(2048 * 15 KHz) |

As can be seen by Table 9, in comparison with a 20 MHz bandwidth, a time for taking sampling at a 1.4 MHz bandwidth is significantly burst. Accordingly, since an error occurs by 16 Ts, an accuracy is low as a result thereof.

However, there is a problem in that such a low accuracy is insufficient to handle an emergency situation.

Accordingly, two mechanisms for improving an accuracy with respect to a bandwidth less than 5 MHz will be described hereinafter. A first mechanism is for improving an interpolation method, and a second mechanism is for improving sampling to be taken more frequently.

The above two mechanisms are described through a simulation.

First, to improve a PRS accuracy, a simulation performed at 1.4 MHz and 10 MHz has the following assumption and a UE operates as follows.

Figure 14:
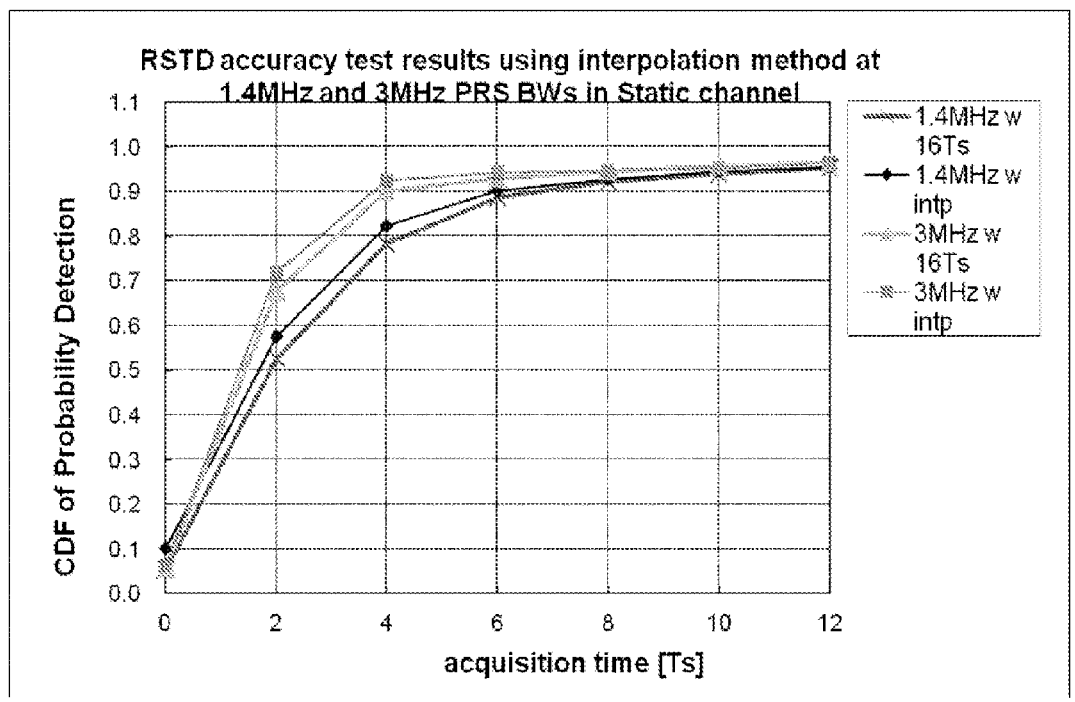
FIG. 14 shows a simulation result obtained by improving an accuracy through an interpolation according to an embodiment of the present invention.

Sampling time for 1.4 MHz: 16 Ts
Sampling time for 10 MHz: 2 TS
The average number of subframes for 1.4 MHz is 6
The average number of subframes for 10 MHz is 1
Margin for RF uncertainty and phase shift error, cell frame synchronization error: 4 Ts for 1.4 MHz and 3 MHz, 3 Ts when a bandwidth is greater than 5 MHz FIG. 14 shows a simulation result obtained by improving an accuracy through an interpolation according to an embodiment of the present invention.

The aforementioned first mechanism is for acquiring an RSTD accuracy which is much superior to the existing performance by using an interpolation in a time domain or a frequency domain. More specifically, the first mechanism uses the same value by performing a linear interpolation or by taking an average.

Referring to the simulation result of FIG. 14, a simulation result obtained by taking an interpolation at a 1.4 MHz bandwidth may show that an accurate is slightly increased in comparison with a case of not taking the interpolation. Likewise, a simulation result obtained by taking an interpolation at a 3 MHz bandwidth may show that an accuracy is slightly increased in comparison with the case of not taking the interpolation.

The improved RSTD accuracy can be summarized as follows.

RSTD accuracy at 1.4 MHz channel bandwidth: ±12 Ts (implementation margin 6 Ts+6 Ts based on interpolation detection probability 90%)

RSTD accuracy at 3 MHz channel bandwidth: ±6 Ts (implementation margin 3 Ts+3 Ts based on interpolation detection probability 90%)

As described above, when the interpolation is taken, an accuracy cannot be significantly improved. However, there is an advantage in that power consumption is not great in comparison with the second mechanism described below.

Figure 15:
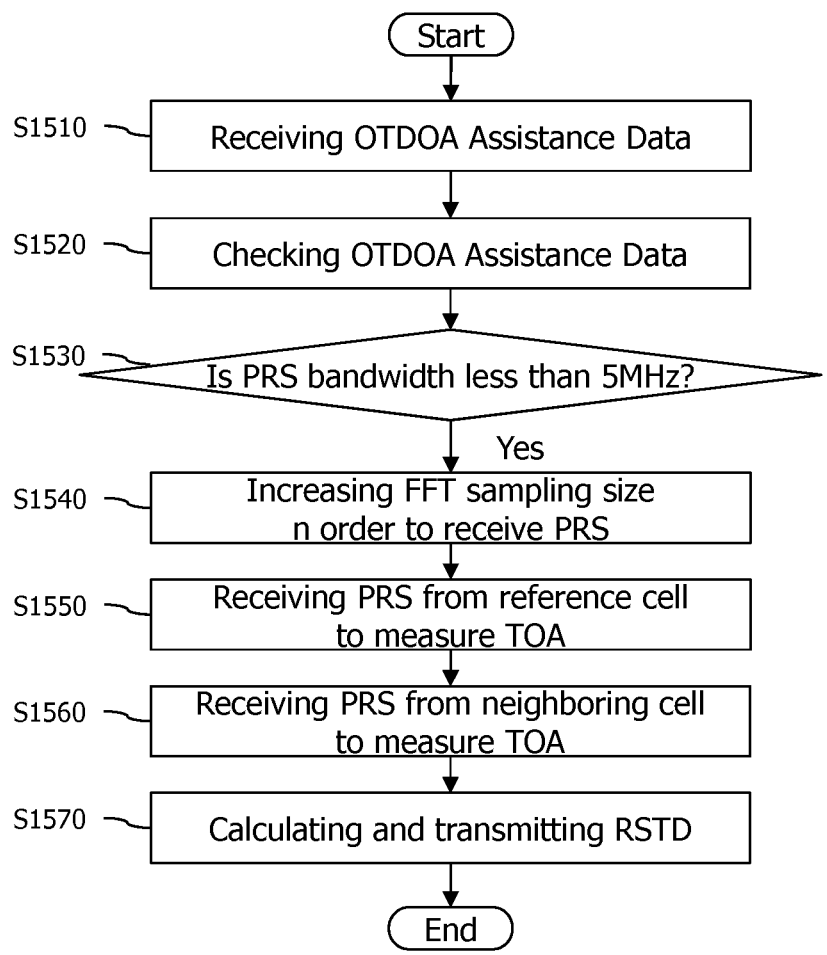
FIG. 15 is a flowchart showing a method of improving an accuracy according to another embodiment of the present invention.

FIG. 15 is a flowchart showing a method of improving an accuracy according to another embodiment of the present invention.

Referring to FIG. 15, a UE receives OTDOA Assistance Data from a location server (step S1510). Subsequently, the UE confirms an OTDOA-ReferenceCellInfo IE and an OTDOA-NeighbourCellInfoList IE which are included in the OTDOA Assistance Data (step S1520).

As a result of confirming a PRS-Info IE included in the OTDOA-ReferenceCellInfo IE or OTDOA-NeighbourCellInfoList IE, if a bandwidth indicated by a PRS bandwidth is less than 5 MHz (step S1530), the UE increases an FFT sampling size to receive a PRS (step S1540). That is, as to a bandwidth less than 5 MHz, a sampling size is increased from 128 to 256 or 512, so that a sampling rate of 8 Ts or 4 Ts, which is less than 16 Ts, can be used. For this, the UE must support a bandwidth flexibly in the range of 1.4 MH to 20 MHz. This is possible because a UE supporting LTE is designed to be capable of flexibly changing a channel bandwidth in this manner.

Thereafter, the UE receives a PRS from a reference cell to measure TOA (step S1550), and receives a PRS from a neighboring cell to measure TOA (S1560). Subsequently, the UE calculates an RSTD, and transmits it to the server at a request (step S1570).

Figure 16:
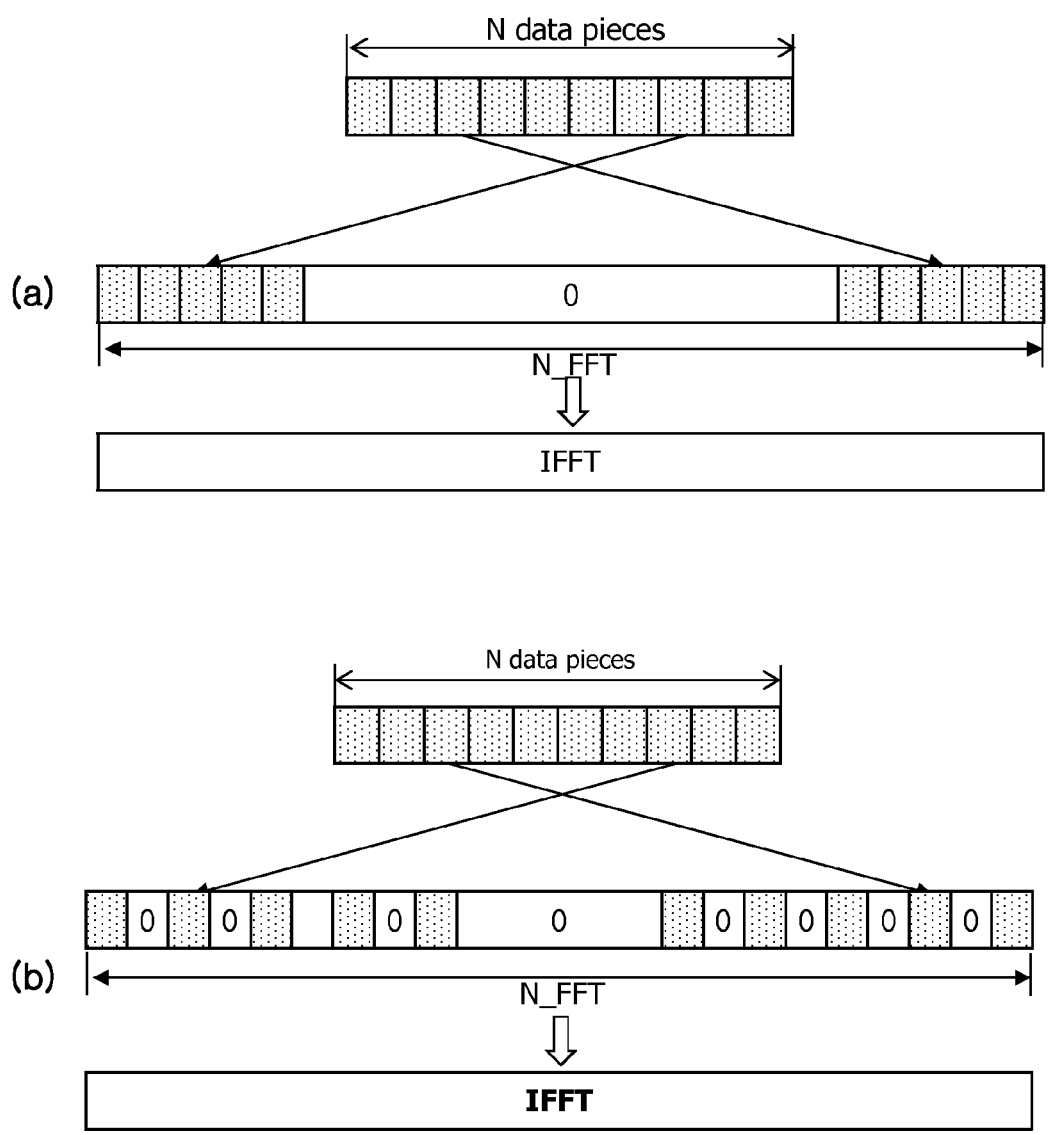
FIG. 16 shows an example of a method of increasing a fast Fourier transform (FFT) sampling size shown in FIG. 15.

FIG. 16 shows an example of a method of increasing an FFT sampling size shown in FIG. 15.

Referring to FIG. 16A, N pieces of data, i.e., 128 pieces of data, are received as a PRS signal on a 1.4 MHz bandwidth for example. In this case, a UE increases an FFT sampling size to 256 or 512 for example. That is, the existing UE separates the 128 pieces of data into two parts (each having 64 pieces of data), and a middle part thereof is filled with 128 zero (o)-bits. Thus, the data is transmitted without an increase in an FFT size. However, since it is not a method of increasing a sampling rate by effectively using a full FFT size, in order to effectively use it, as shown in FIG. 16B, the data is separated into two parts and thereafter '0' is filled between one data piece and another data piece. In this manner, when FFT is taken again in a receiver after passing a channel, sampled information between one data piece and another data piece can be additionally obtained by using a signal for '0'.

That is, referring to FIG. 16B, when using a method of padding a zero-bit between one data piece and another data piece, oversampling is achieved in a time domain by the increased number of zeros, and thus a value of a duration which is not sampled in the existing data can be easily acquired.

In doing so, a control is possible in unit of Ts starting from 8 Ts, not 16 Ts, at 1.4 MHz. That is, if a zero-bit is filled one by one between respective data pieces, it becomes 8 Ts (256 sampling), and if three bits are filled with '0', a sampling time of 4 Ts can be acquired equally to a case of using 512 sampling. In this manner, more various oversampling rates are possible, and thus a performance gain can be acquired as shown in FIG. 17 and FIG. 18.

Figure 17:
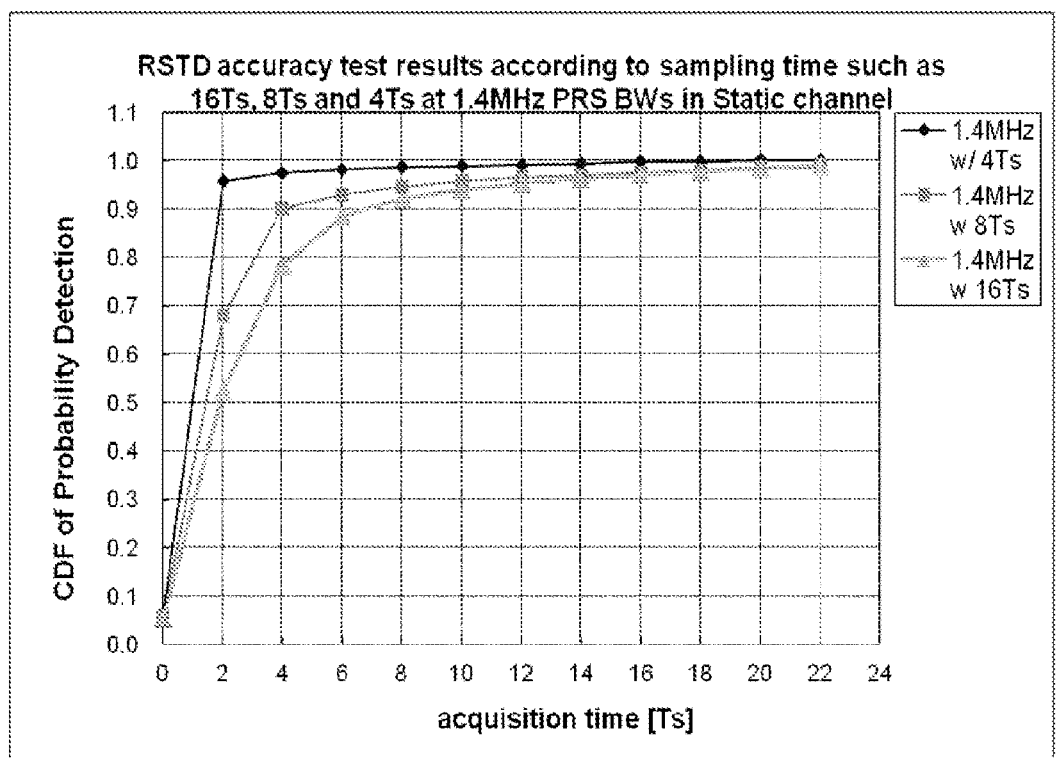
FIG. 17 and FIG. 18 show simulation results based on a mechanism of FIG. 16.
Figure 18:
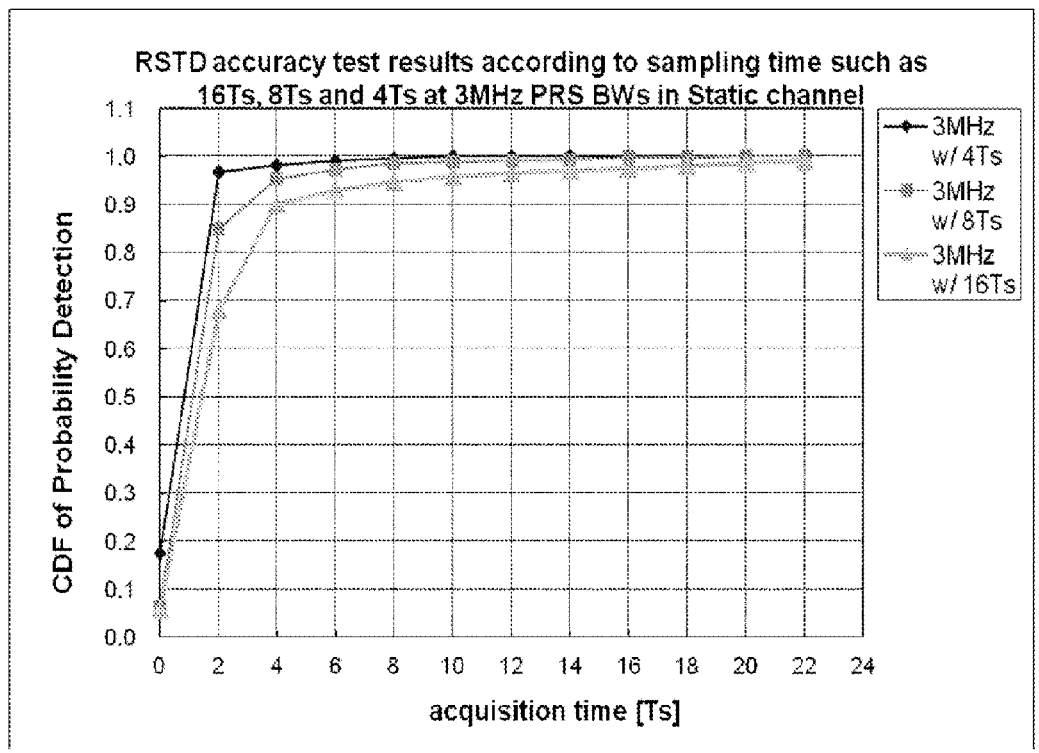

FIG. 17 and FIG. 18 show simulation results based on a mechanism of FIG. 16.

Referring to FIG. 17, if a sampling rate is decreased from 16 Ts to 8 Ts and further to 4 Ts by increasing an FFT sampling size of a PRS received at a 1.4 MHz bandwidth, a detection probability can be further increased, and a detection time can also be decreased.

Likewise, referring to FIG. 18, if a sampling rate is decreased from 16 Ts to 8 Ts and further to 4 Ts by increasing an FFT sampling size of a PRS received at a 3 MHz bandwidth, a detection probability can be further increased, and a detection time can also be decreased.

On the basis of the above simulation result, it is proved that an RSTD accuracy can be improved by using an interpolation method or a method of increasing an FFT sampling size.

Meanwhile, if a secondary cell is inactivated and a reference cell and a target neighboring cell correspond to SCell, an RSTD accuracy for a carrier aggregation can be achieved by a smallest PRS bandwidth between the reference cell and the target neighboring cell.

The improved RSTD accuracy can be summarized by Table 10 below.

are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

The aforementioned embodiments include various exemplary aspects. Although all possible combinations for representing the various aspects cannot be described, it will be understood by those skilled in the art that other combinations are also possible. Therefore, all replacements, modifications and changes should fall within the spirit and scope of the claims of the present invention.

TABLE 10

| Parameters | Minimum transmission band [RB] among serving cell, a reference cell, and neighboring cell | The minimum number of available subframes for measurement among serving cell, reference cell, and neighboring cell | Unit | Accuracy [Ts] | Condition 1, 4, 6, 10, 11, 18, 19, 21, 33, 34, 35, 36, 37, 38, 39 and 40 | 3, 8, 12, 13, 14, 17, 20 | |
|---|---|---|---|---|---|---|---|
| RSTD for (PRS Es/Iot)$_{ref}$ = −6 dB and (PRS Es/Iot)$_i$ = −13 dB | 25 50 | 6 4 2 1 | $T_s$ | | — | — | −118 dBm/ 15 kHz- 50 dBm/ BW$_{Channel}$ | −120 dBm/ 15 kHz- 50 dBm/ BW$_{Channel}$ |

Figure 19:
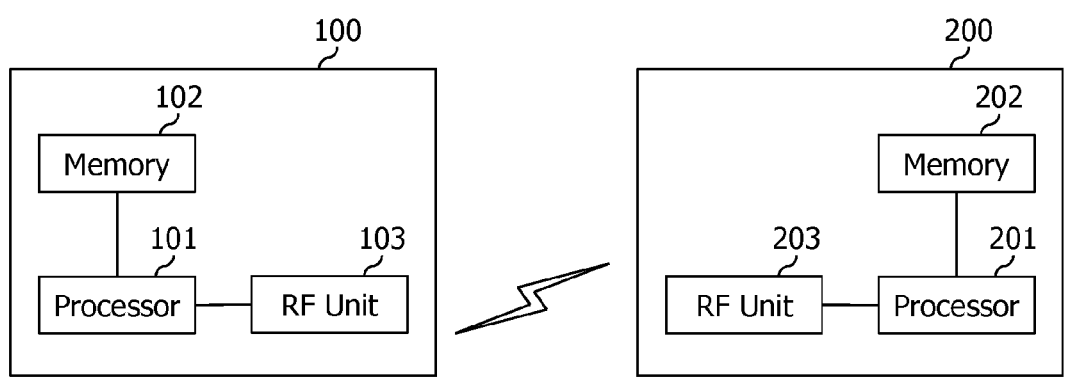
FIG. 19 is a block diagram showing a wireless communication system according to an embodiment of the present invention.

FIG. 19 is a block diagram showing a wireless communication system according to an embodiment of the present invention.

A BS 200 includes a processor 201, a memory 202, and a radio frequency (RF) unit 203. The processor 201 implements the proposed functions, procedures, and/or methods. Layers of a radio interface protocol may be implemented by the processor 201. The memory 202 is coupled to the processor 201, and stores a variety of information for driving the processor 201. The RF unit 203 is coupled to the processor 201, and transmits and/or receives a radio signal.

A UE 100 includes a processor 101, a memory 102, and an RF unit 103. The processor 101 implements the proposed functions, procedures, and/or methods. Layers of a radio interface protocol may be implemented by the processor 101. The memory 102 is coupled to the processor 101, and stores a variety of information for driving the processor 101. The RF unit 103 is coupled to the processor 101, and transmits and/or receives a radio signal.

The processors 101 and 201 may include an application-specific integrated circuit (ASIC), a separate chipset, a logic circuit, and/or a data processing unit. The memories 102 and 202 may include a read-only memory (ROM), a random access memory (RAM), a flash memory, a memory card, a storage medium, and/or other equivalent storage devices. The RF units 103 and 203 may include a base-band circuit for processing a radio signal. When the embodiment of the present invention is implemented in software, the aforementioned methods may be implemented with a module (i.e., process, function, etc.) for performing the aforementioned functions. The module may be stored in the memories 102 and 202 and may be performed by the processors 101 and 201. The memories 102 and 202 may be located inside or outside the processors 101 and 201, and may be coupled to the processors 101 and 201 by using various well-known means.

Although the aforementioned exemplary system has been described on the basis of a flowchart in which steps or blocks

What is claimed is:

1. A method of measuring a position in a wireless communication system, the method comprising:
   receiving observed time difference of arrival (OTDOA) assistance data from a location server;
   comparing a bandwidth of a positioning reference signal (PRS) included in the OTDOA assistance data with a specific bandwidth;
   increasing a fast Fourier transform (FFT) sampling size when the bandwidth of the PRS included in the OTDOA assistance data is narrow than the specific bandwidth;
   processing a plurality of received PRSs by using the increased FFT sampling size; and
   calculating a reference signal time difference (RSTD) between the plurality of received PRSs.

2. The method of claim 1, wherein in the increasing of the FFT sampling size, if the bandwidth of the PRS is 1.4 MHz, the FFT sampling size is increased from 128 to 256, 512, or 1024.

3. The method of claim 1, wherein in the increasing of the FFT sampling size, if the bandwidth of the PRS is 3 MHz, the FFT sampling size is increased from 256 to 512 or 1024.

4. The method of claim 1, wherein in the increasing of the FFT sampling size, a zero-bit is filled between N pieces of data of the PRS signal.

5. The method of claim 1, wherein if the bandwidth of the PRS is 1.4 MHz, a sampling rate is decreased from 16 Ts to 8 Ts or 4 Ts by increasing the FFT sampling size.

6. A terminal for performing a position in a wireless communication system, the terminal comprising:
   a radio frequency (RF) unit for receiving observed time difference of arrival (OTDOA) assistance data from a location server; and
   a processor configured to:
   compare a bandwidth of a positioning reference signal (PRS) included in the OTDOA assistance data with a specific bandwidth;

increase a fast Fourier transform (FFT) sampling size when the bandwidth of the PRS included in the OTDOA assistance data is narrow than the specific bandwidth, process a plurality of received PRSs by using the increased FFT sampling size, and calculate a reference signal time difference (RSTD) between the plurality of received PRSs.

7. The terminal of claim 6, wherein if the bandwidth of the PRS is 1.4 MHz, the processor increases the FFT sampling size from 128 to 256, 512, or 1024.

8. The terminal of claim 6, wherein if the bandwidth of the PRS is 3 MHz, the processor increases the FFT sampling size from 256 to 512 or 1024.

9. The terminal of claim 6, wherein the processor fills a zero-bit between N pieces of data of the PRS signal.

* * * * *